US011455079B2

(12) United States Patent
Seiden et al.

(10) Patent No.: US 11,455,079 B2
(45) Date of Patent: Sep. 27, 2022

(54) NESTED PAGINATION FOR PRESENTING A DATA SET IN A GRAPHICAL USER INTERFACE

(71) Applicant: SIGMA COMPUTING, INC., San Francisco, CA (US)

(72) Inventors: Max H. Seiden, San Francisco, CA (US); James L. Gale, San Francisco, CA (US); Robert C. Woollen, San Rafael, CA (US); Jason D. Frantz, San Francisco, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 473 days.

(21) Appl. No.: 16/180,777

(22) Filed: Nov. 5, 2018

(65) Prior Publication Data

US 2020/0142551 A1    May 7, 2020

(51) Int. Cl.
  *G06F 3/0483* (2013.01)
  *G06F 3/0485* (2022.01)
  *G06F 9/451* (2018.01)
  *G06F 16/245* (2019.01)
  *G06F 40/114* (2020.01)
  *G06F 40/18* (2020.01)
  *G06F 3/0482* (2013.01)

(52) U.S. Cl.
  CPC .......... *G06F 3/0483* (2013.01); *G06F 3/0485* (2013.01); *G06F 3/0482* (2013.01); *G06F 9/451* (2018.02); *G06F 16/245* (2019.01); *G06F 40/114* (2020.01); *G06F 40/18* (2020.01)

(58) Field of Classification Search
  CPC .... G06F 3/0483; G06F 3/0485; G06F 3/0482; G06F 9/451; G06F 16/245; G06F 16/284; G06F 16/285; G06F 16/287; G06F 16/904; G06F 16/34; G06F 16/345; G06F 17/217; G06F 17/246; G06F 17/245; G06F 40/18; G06F 40/114
  USPC ........................................................ 715/218
  See application file for complete search history.

(56) References Cited

U.S. PATENT DOCUMENTS

| 5,255,356 | A | * | 10/1993 | Michelman | ........... G06F 17/246 715/212 |
| 6,526,399 | B1 | * | 2/2003 | Coulson | ................ G06F 17/246 |
| 6,711,715 | B1 | * | 3/2004 | Grealish | ................... G06F 3/14 715/205 |

(Continued)

FOREIGN PATENT DOCUMENTS

| EP | 1610231 A2 | 12/2005 |
| WO | 02057932 A1 | 7/2002 |

OTHER PUBLICATIONS

International Search Report and Written Opinion, PCT/US2019/059625, dated Jan. 16, 2020, 10 pages.

*Primary Examiner* — David S Posigian

(57) ABSTRACT

Nested pagination for presenting a data set in a graphical user interface (GUI) including receiving a request for the data set to present in a GUI, wherein the request comprises a group name identifying a nested group of rows in the data set; selecting an anchor point from the data set using the group name, wherein the anchor point is within the group of rows identified by the group name; selecting, using the anchor point, a subset of the data set for presentation in the GUI, wherein the subset of the data set comprises the anchor point; and presenting the subset of the data set in the GUI.

20 Claims, 8 Drawing Sheets

(56) References Cited

U.S. PATENT DOCUMENTS

| | | | |
|---|---|---|---|
| 2006/0004794 A1* | 1/2006 | Pizzo | G06F 16/2445 |
| 2006/0085744 A1* | 4/2006 | Hays | G06F 17/245 |
| | | | 715/255 |
| 2006/0107196 A1* | 5/2006 | Thanu | G06F 17/246 |
| | | | 715/217 |
| 2006/0200764 A1* | 9/2006 | Sellers | G06F 3/0485 |
| | | | 715/205 |
| 2007/0067710 A1* | 3/2007 | Clark | G06F 3/0482 |
| | | | 715/234 |
| 2009/0031208 A1* | 1/2009 | Robinson | G06F 17/245 |
| | | | 715/227 |
| 2009/0187815 A1* | 7/2009 | Becerra, Sr. | G06F 3/04815 |
| | | | 715/212 |
| 2009/0292718 A1* | 11/2009 | Cuneo | H04L 67/42 |
| 2010/0088641 A1* | 4/2010 | Choi | G06F 3/0482 |
| | | | 715/828 |
| 2014/0164896 A1* | 6/2014 | Schlereth | G06F 17/246 |
| | | | 715/217 |
| 2016/0034267 A1* | 2/2016 | Wetzold | G06F 8/71 |
| | | | 717/172 |

\* cited by examiner

FIG. 4

NESTED PAGINATION FOR PRESENTING A DATA SET IN A GRAPHICAL USER INTERFACE

BACKGROUND

Field of the Invention

The field of the invention is data processing, or, more specifically, methods, apparatus, and products for nested pagination for presenting a data set in a graphical user interface.

Description of Related Art

Modern businesses may store large amounts of data in remote databases within cloud-based data warehouses. This data may be accessed using database query languages, such as structured query language (SQL). However, some query responses may include too much data to present efficiently in a web application.

SUMMARY

Methods, systems, and apparatus for nested pagination for presenting a data set in a graphical user interface (GUI). Nested pagination for presenting a data set in a GUI includes receiving a request for the data set to present in a GUI, wherein the request comprises a group name identifying a nested group of rows in the data set; selecting an anchor point from the data set using the group name, wherein the anchor point is within the group of rows identified by the group name; selecting, using the anchor point, a subset of the data set for presentation in the GUI, wherein the subset of the data set comprises the anchor point; and presenting the subset of the data set in the GUI.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a block diagram of an example system configured for nested pagination for presenting a data set in a GUI according to embodiments of the present invention.

DETAILED DESCRIPTION

Figure 1:
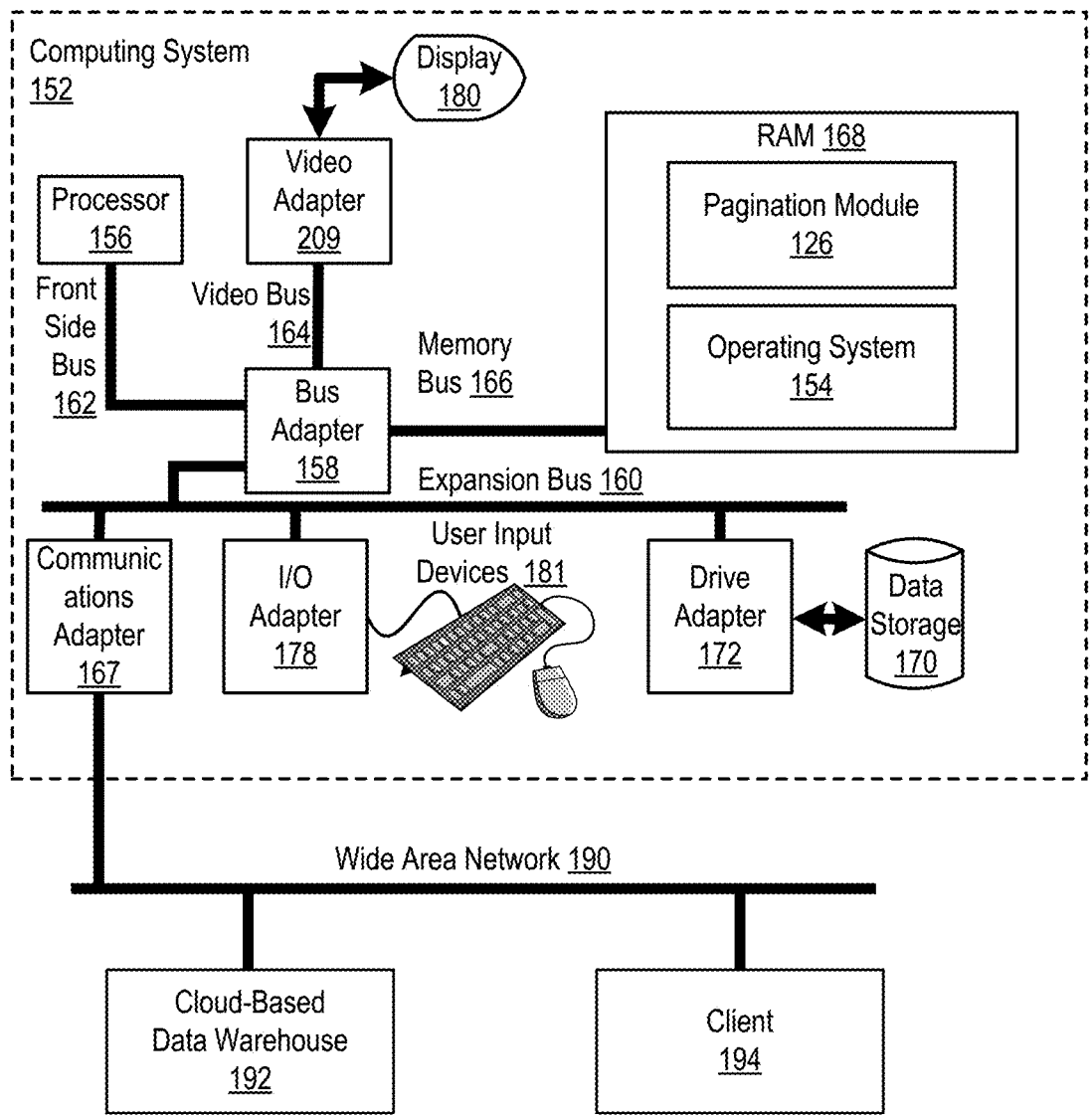
FIG. 1 sets forth a block diagram of an example system configured for nested pagination for presenting a data set in a graphical user interface (GUI) according to embodiments of the present invention.

Exemplary methods, apparatus, and products for nested pagination for presenting a data set in a graphical user interface (GUI) in accordance with the present invention are described with reference to the accompanying drawings, beginning with FIG. 1. FIG. 1 sets forth a block diagram of automated computing machinery comprising an exemplary computing system (152) configured for nested pagination for presenting a data set in a GUI according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for nested pagination for presenting a data set in a GUI according to embodiments of the present invention include UNIX™, Linux, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the pagination module (126), a module for nested pagination for presenting a data set in a GUI according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for nested pagination for presenting a data set in a GUI according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for nested pagination for presenting a data set in a GUI according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the pagination module (126) on the computing system (152).

Figure 2:
FIG. 2 sets forth a block diagram of an example system configured for nested pagination for presenting a data set in a GUI according to embodiments of the present invention.

FIG. 2 shows an exemplary graphical user interface (GUI) for nested pagination for presenting a data set in a GUI according to embodiments of the present invention. As shown in FIG. 2, the exemplary GUI (200) includes a spreadsheet structure (202). The spreadsheet structure (202) presents a data set with multiple columns and rows. The spreadsheet structure (202) includes a number of nested groups, including nested group (204) with the group name "CA".

The GUI (200) is a user interface that presents graphical elements to a user and receives user input from the user. The GUI (200) may be presented, in part, by a pagination module and displayed on a client system (e.g., on a system display or mobile touchscreen). The GUI (200) may be an Internet application hosted on a server system communicatively coupled to both the client system and a cloud-based data warehouse.

The GUI (200) may be managed, in part, by a pagination module. The pagination module is hardware, software, or an aggregation of hardware and software configured to determine a subset of the data set to present to the GUI (200). Specifically, the pagination module (126) may determine which portion of the entire requested data set is to be requested and then loaded onto GUI (200) hosted on the client.

The pagination module (126) may be part of a database query generator that generates the database query. The database query may be auto-populated in response to various selections by the user, such as selecting columns for the hierarchical relationship, filters, and column sorting. A block of database statements may be generated for each selection made by a user. After each selection is made, the blocks of database statements may be combined to generate the database query. After the last selection is made, the blocks of database statements may be combined into a single database query. Once the database query is generated, the database query generator may send the database query over a wide area network to the cloud-based data warehouse. The database query may include a structure query language (SQL) statement. The statement or statements may be auto-populated, and multiple statements may be nested within one another.

The spreadsheet structure (202) is a graphical element and organizing mechanism for the data set. The spreadsheet structure (202) displays the data within the data set as rows of data organized by columns. The columns delineate different groups of the data in each row of the data set. Some columns may be calculations using other columns in the data set.

The data set is a collection of data from a cloud-based data warehouse presented in the spreadsheet structure (202). The data set may be a result of a database query sent by a database query generator to a database in the cloud-based data warehouse. The data set may be received by the pagination module and configured for presentation in the spreadsheet structure (202).

Some columns may be arranged in a hierarchical relationship to other columns. The term "hierarchical relationship" refers to subordinate and superior groupings of columns. For example, as shown in FIG. 2, the database includes rows for baby names based on state, year, gender, and popularity rank. The data set presented in the GUI (200) of FIG. 2 has been grouped first by state, then by year, and finally by gender. Accordingly, the state column is at the highest level in the hierarchical relationship, the year column is at the second level in the hierarchical relationship, and the gender column is at the lowest level in the hierarchical relationship.

Once the columns are grouped into a hierarchical relationship as shown in FIG. 2, each row in the upper level hierarchies is a nested group with a group name. As shown in FIG. 2, nested group (204) of rows has the group name "CA"

Figure 3:
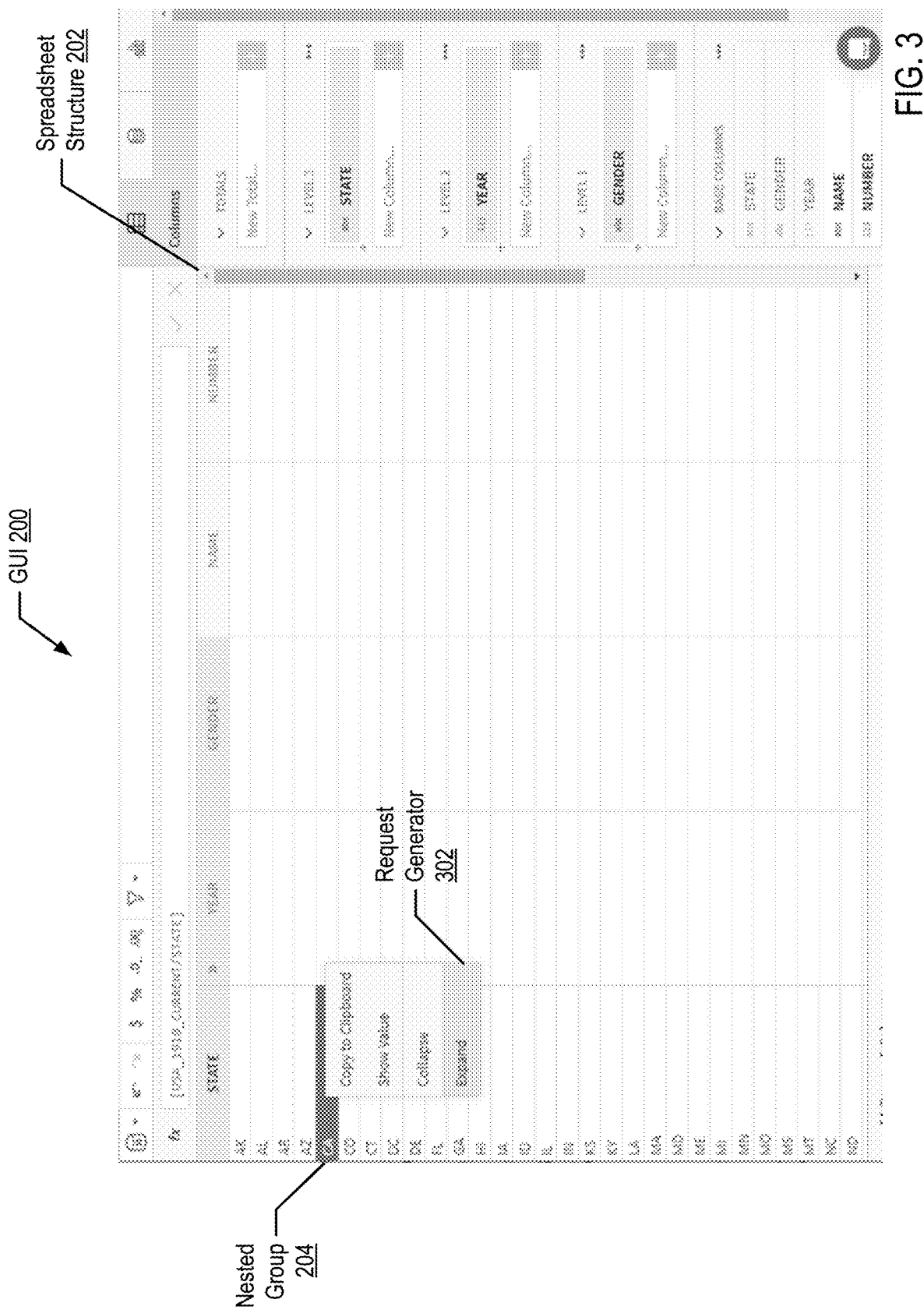
FIG. 3 sets forth a block diagram of an example system configured for nested pagination for presenting a data set in a GUI according to embodiments of the present invention.

FIG. 3 shows an exemplary implementation of a GUI for nested pagination for presenting a data set in a GUI according to embodiments of the present invention. Specifically, FIG. 3 shows a menu with a request generator (302) option labeled "Expand". The request generator (302) option may be accessible, for example, by selecting the nested group (204) and opening an options menu (e.g., by right clicking a mouse button). The request generator (302) is an activity that generates a request (620) for a data set to present in the spreadsheet structure (202) of the GUI (200). By activating the request generator (302), a request is generated indicating a user would like to view the data set as an expanded list of rows in the spreadsheet structure (202).

Figure 4:
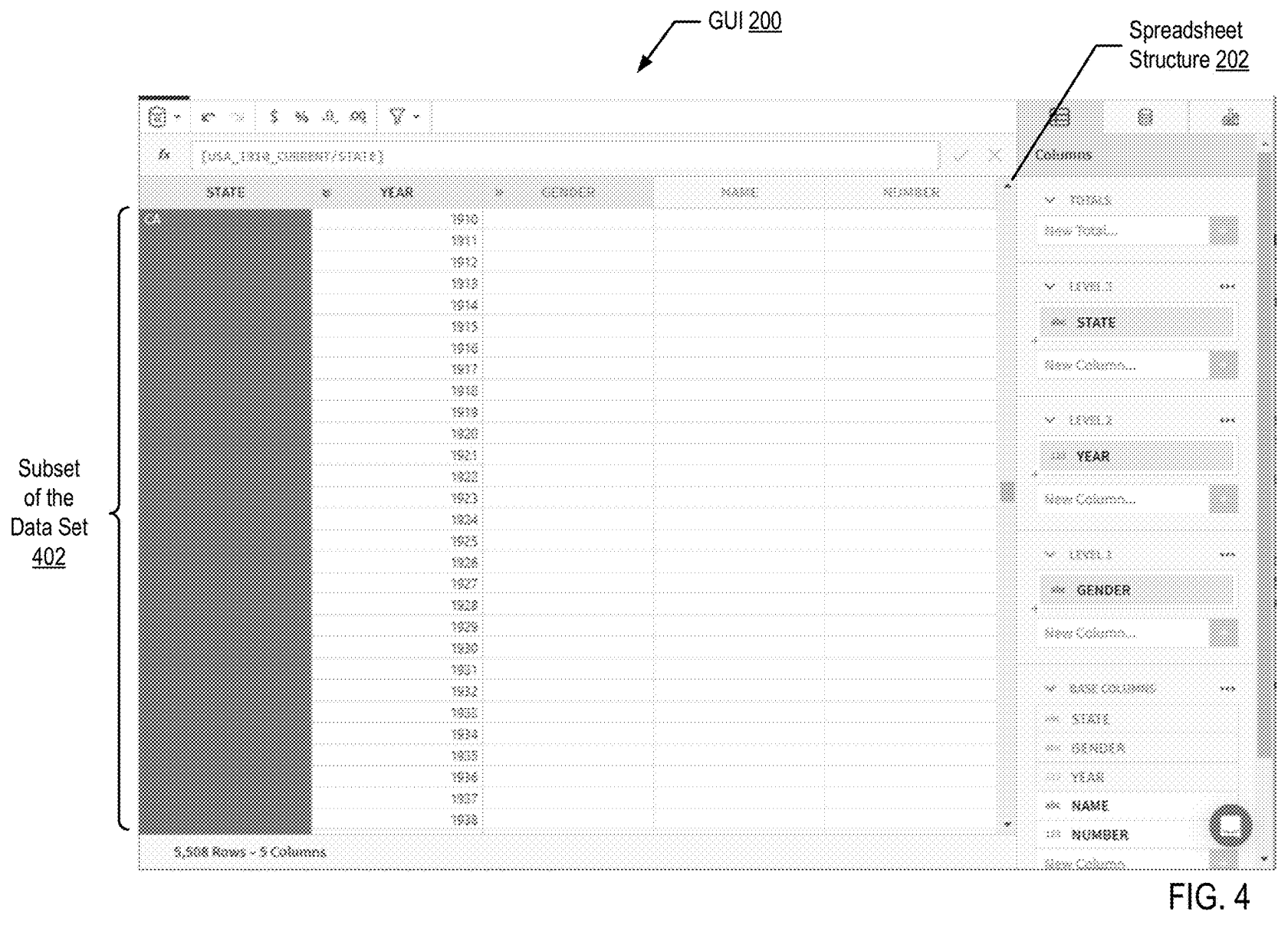

FIG. 4 shows an exemplary implementation of a GUI for nested pagination for presenting a data set in a GUI according to embodiments of the present invention. Specifically, FIG. 4 shows the spreadsheet structure (202) with the state column expanded to present the subset of the data set (402). Because the entire requested data set may be very large, loading the entire requested data set in the spreadsheet structure (202) of the GUI (202) may not be possible or may overutilize the available resources of the client hosting the GUI (200). Therefore, only a subset of the data set (402) is presented in the spreadsheet structure (202) of the GUI (202) at any given time. As shown in FIG. 4, the first 29 rows of the "CA" group are presented in the GUI (202). Additional rows may have been provided to the GUI (200) and may be ready for presentation (e.g., 1000 rows). Retrieving additional rows of the requested data set may require an additional database query.

In addition to the "Expand" request generator (302) option in the menu shown in FIG. 3, an additional request generator (302) may be at the top or bottom of the subset of the data set (402). For example, if 1000 rows are loaded into the spreadsheet structure (202) of the GUI (202) and a user scrolls down to the $1000^{th}$ row, a request may be generated to retrieve the data set to present in the GUI (202). The new request may include parameters indicating a different subset of the data set (402) to be presented in the GUI (200). In the example, the parameters may indicate that the subset of the data set (402) should begin with or include the rows following the 1000$^{th}$ row.

Figure 5:
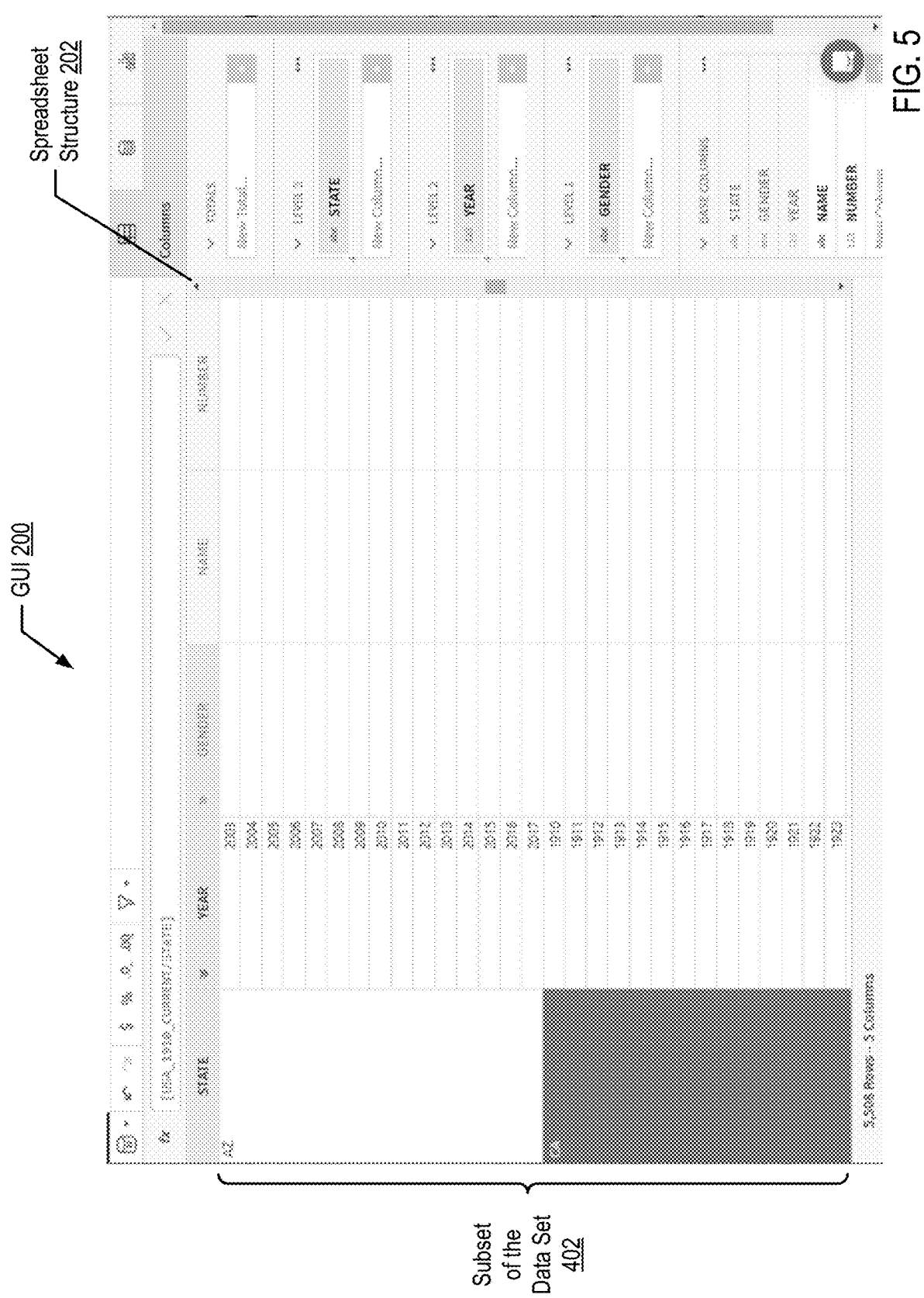
FIG. 5 sets forth a block diagram of an example system configured for nested pagination for presenting a data set in a GUI according to embodiments of the present invention.

FIG. 5 shows an exemplary implementation of a GUI for nested pagination for presenting a data set in a GUI according to embodiments of the present invention. Like FIG. 4, FIG. 5 shows the spreadsheet structure (202) with the state column expanded to present the subset of the data set (402). However, FIG. 5 shows rows in the "AZ" group as part of the subset of the data set (402) presented in the GUI (200). FIG. 5 may be displayed after a user has scrolled up from the GUI (200) presented in FIG. 4.

Figure 6:
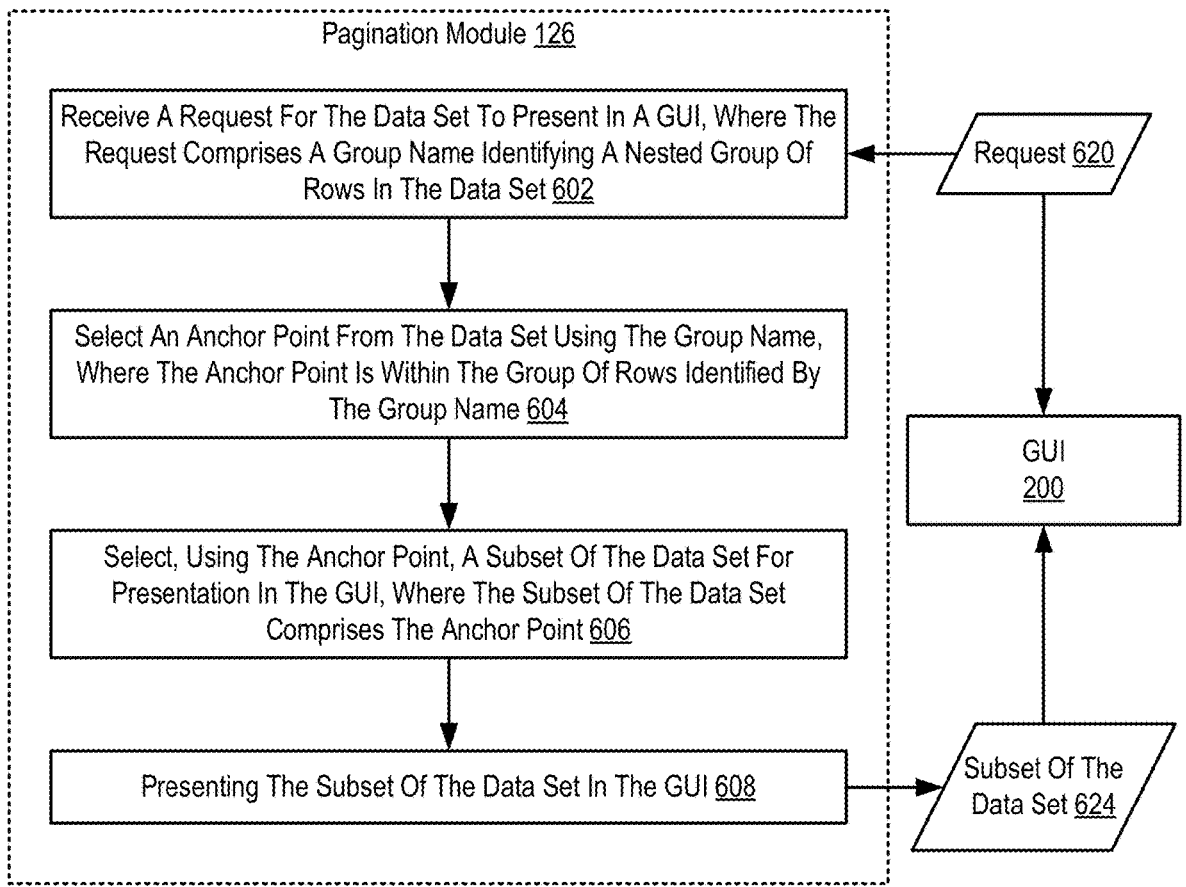
FIG. 6 sets forth a flow chart illustrating an exemplary method for nested pagination for presenting a data set in a GUI according to embodiments of the present invention.

For further explanation, FIG. 6 sets forth a flow chart illustrating an exemplary method for nested pagination for presenting a data set in a GUI according to embodiments of the present invention that includes receiving (602) a request (620) for the data set to present in a GUI (200), wherein the request (620) comprises a group name identifying a nested group of rows in the data set. Receiving (602) a request (620) for the data set to present in a GUI (200), wherein the request (620) comprises a group name identifying a nested group of rows in the data set may be carried out by the pagination module (126) receiving an instruction to expand the group of rows. The instruction may be generated based on a user activating a request generator in an options menu for the nested group.

Receiving (602) a request (620) for the data set to present in a GUI (200), wherein the request (620) comprises a group name identifying a nested group of rows in the data set may also be carried out by the pagination module (126) detecting that a user has scrolled to an edge of the subset of the data set. A user may scroll to the top or the bottom of a previously retrieved and presented subset of the data set. In response to detecting that the user has scrolled to the top or bottom of the subset of the data set, a request (620) may be generated that includes the group name of the nested group of rows at the edge of the subset of the data set. The request (620) may further include an indication (such as an offset) of a row at or near the edge of the previously retrieved and presented subset of the data set.

A nested group of rows in the data set is a group of rows that each include identical data in a column that is hierarchically above at least one other column. The group name identifying the nested group of rows in the data set may be the data stored in the column or another reference to the column. However, the group name does not include a reference to the location of the row in the data set, such as a row number.

The method of FIG. 6 further includes selecting (604) an anchor point from the data set using the group name, wherein the anchor point is within the group of rows identified by the group name. Selecting (604) an anchor point from the data set using the group name, wherein the anchor point is within the group of rows identified by the group name may be carried out by the pagination module (126) using the group name to select an anchor point. The anchor point is a location within the data set that provides a relative location from which to define a subset of the data set for presentation in the GUI (200). The anchor point may be set, for example, at the top of a group or the bottom of a group. For example, the subset of the data set for presentation in the GUI (200) may be defined as the first 1000 rows beginning with the anchor point and sorted alphabetically by the column highest in the hierarchy. As another example, the subset of the data set for presentation in the GUI (200) may be defined as the 500 rows before the anchor point and the 500 rows following the anchor point.

Instead of defining and identifying the anchor point using a reference to a specific row (e.g., a row number), the anchor point may be defined and identified using cell values. Specifically, a group is a collection of rows that contain the same value for one column. The group name refers to the value in the common set of rows in the group. The anchor point is defined as a location (e.g., top or bottom) within the rows of the group with the matching cell values. The anchor point may therefore be identified using a group name (i.e., matching cell value) and a location (e.g., top or bottom). In the example of FIG. 4 and FIG. 5, the anchor point may be identified as the top of "CA".

The anchor point may be selected based on a selection policy, and the selection policy may be selected based on the request. For example, if the request (620) is triggered by the activation of an "Expand" option in a menu for a nested group, a selection policy may be selected that states the first row in the nested group is selected as the anchor point. As another example, if the request (620) is triggered by a user reaching an edge of the previously retrieved and presented subset of the data set, a selection policy may be selected that states the row immediately adjacent to the edge row and that is not part of the previously retrieved and presented subset of the data set is selected as the anchor point.

The anchor point may be selected without using a row number or an offset from a row in the data set. Specifically, for large data sets, using a row number or offset for an anchor point can be inefficient and a poor use of resources. Instead, the anchor point is selected using the properties of the data set such as the nested groupings of the columns. Specifically, the anchor point may be selected by the pagination module (126) based on the group name that identifies a nested group of rows. The anchor point may therefore be selected without the pagination module (126) determining or utilizing information about the relative location of the anchor point within the data set.

The method of FIG. 6 further includes selecting (606), using the anchor point, a subset of the data set (624) for presentation in the GUI (200), wherein the subset of the data set (624) comprises the anchor point. Selecting (606), using the anchor point, a subset of the data set (624) for presentation in the GUI (200), wherein the subset of the data set (624) comprises the anchor point may be carried out by the pagination module (126) selecting a group of rows for presentation in the GUI (200) based on the location of the anchor point and information from the request (620) and/or the selection policy.

The selected subset of the data set may include at least one row from outside the nested group of rows. Specifically, the group of rows selected for the subset of the data set (624) may include rows from a nested group above or below the nested group that includes the anchor point. Consider the example of FIG. 5. The presented subset of the data set includes rows from the nest group "CA" as well as the nest group "AZ".

The method of FIG. 6 further includes presenting (608) the subset of the data set (624) in the GUI (200). Presenting (608) the subset of the data set (624) in the GUI (200) may be carried out by the pagination module (126) providing the subset of the data set (624) to the spreadsheet structure in the GUI (200). Presenting (608) the subset of the data set (624) in the GUI (200) may also be carried out by the pagination module (126), in conjunction with a database query generator, generating the database query using information describing the selected subset of the data set (624) (e.g., the anchor point, offset, and limit) and sending the database query to the cloud-based data warehouse. In response, the pagination module (126) may receive the subset of the data set (624) from the cloud-based data warehouse for presentation in the GUI (200).

The above limitations improve the operation of the computer system by efficiently selecting a subset of a data set for display in a GUI on a client system without using large row offsets. This allows a subset of the data set to be requested and displayed with minimal resource overhead. In addition, the above limitations describe a specific, structured system and graphical user interface paired with a prescribed functionality directly related to the graphical user interface's structure that is addressed to and resolves a specifically identified problem in the prior state of the art. Specifically, the presentation of a subset of the data set with additional subsets presented as necessary provides a user with the impression that the entire requested data set is presented in the GUI without the resource overhead of loading the entire requested data set.

Figure 7:
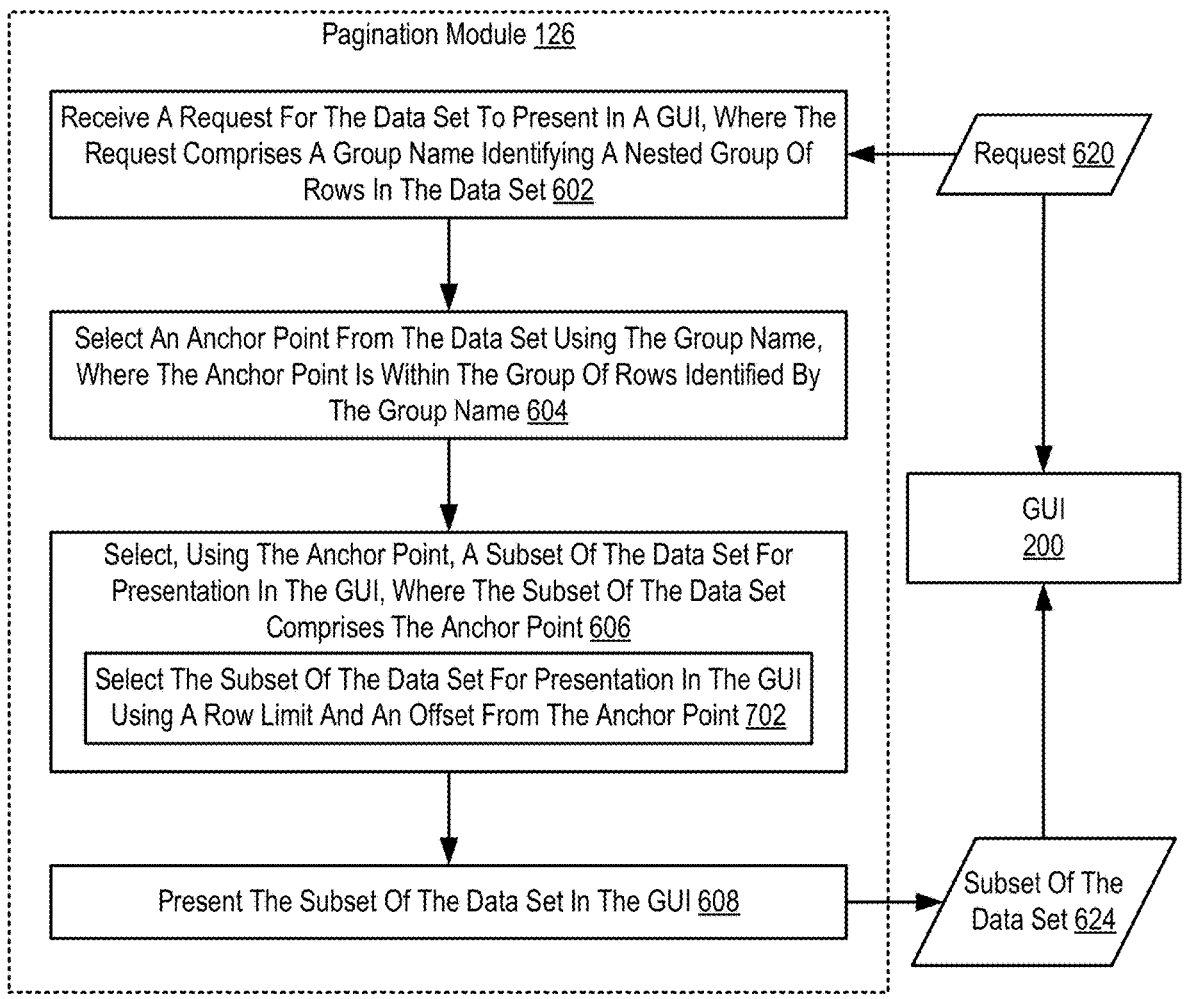
FIG. 7 sets forth a flow chart illustrating an exemplary method for nested pagination for presenting a data set in a GUI according to embodiments of the present invention.

For further explanation, FIG. 7 sets forth a flow chart illustrating a further exemplary method for nested pagination for presenting a data set in a GUI according to embodiments of the present invention that includes receiving (602) a request (620) for the data set to present in a GUI (200), wherein the request (620) comprises a group name identifying a nested group of rows in the data set; selecting (604) an anchor point from the data set using the group name, wherein the anchor point is within the group of rows identified by the group name; selecting (606), using the anchor point, a subset of the data set (624) for presentation in the GUI, wherein the subset of the data set (624) comprises the anchor point; and presenting (608) the subset of the data set (624) in the GUI (200).

The method of FIG. 7 differs from the method of FIG. 3, however, in that selecting (606), using the anchor point, a subset of the data set (624) for presentation in the GUI, wherein the subset of the data set (624) comprises the anchor point includes selecting (702) the subset of the data set (624) for presentation in the GUI (200) using a row limit and an offset from the anchor point. Selecting (702) the subset of the data set (624) for presentation in the GUI (200) using a row limit and an offset from the anchor point may be carried out by the pagination module (126) determining a row limit and an offset for the data set.

The row limit defines the maximum number of rows in the subset of the data set. The offset defines the first row, relative to the anchor point, in the data set from which rows of data are selected for the subset of the data set (up to the row limit). The offset may be positive or negative. The same subset of the data set may be defined in many different ways using different anchor points, offsets, and limits.

As shown in the example of FIG. 4 and FIG. 5, the anchor point may be selected as top of the "CA" nested group. The subset of the data set may be selected using an offset of −500 and the row limit may be 1000. Therefore, the subset of the data set may begin with the last 500 rows of the "AZ" nested group and the first 500 rows of the "CA" nested group.

The subset of the data set may be contained within a single nested group. Specifically, only rows from the same nested group as the anchor point may be selected for the subset of the data set. Consequently, when expanded, only rows in the selected nested group would be presented, and rows from the nested group above and below the selected nested group would remain collapsed.

Figure 8:
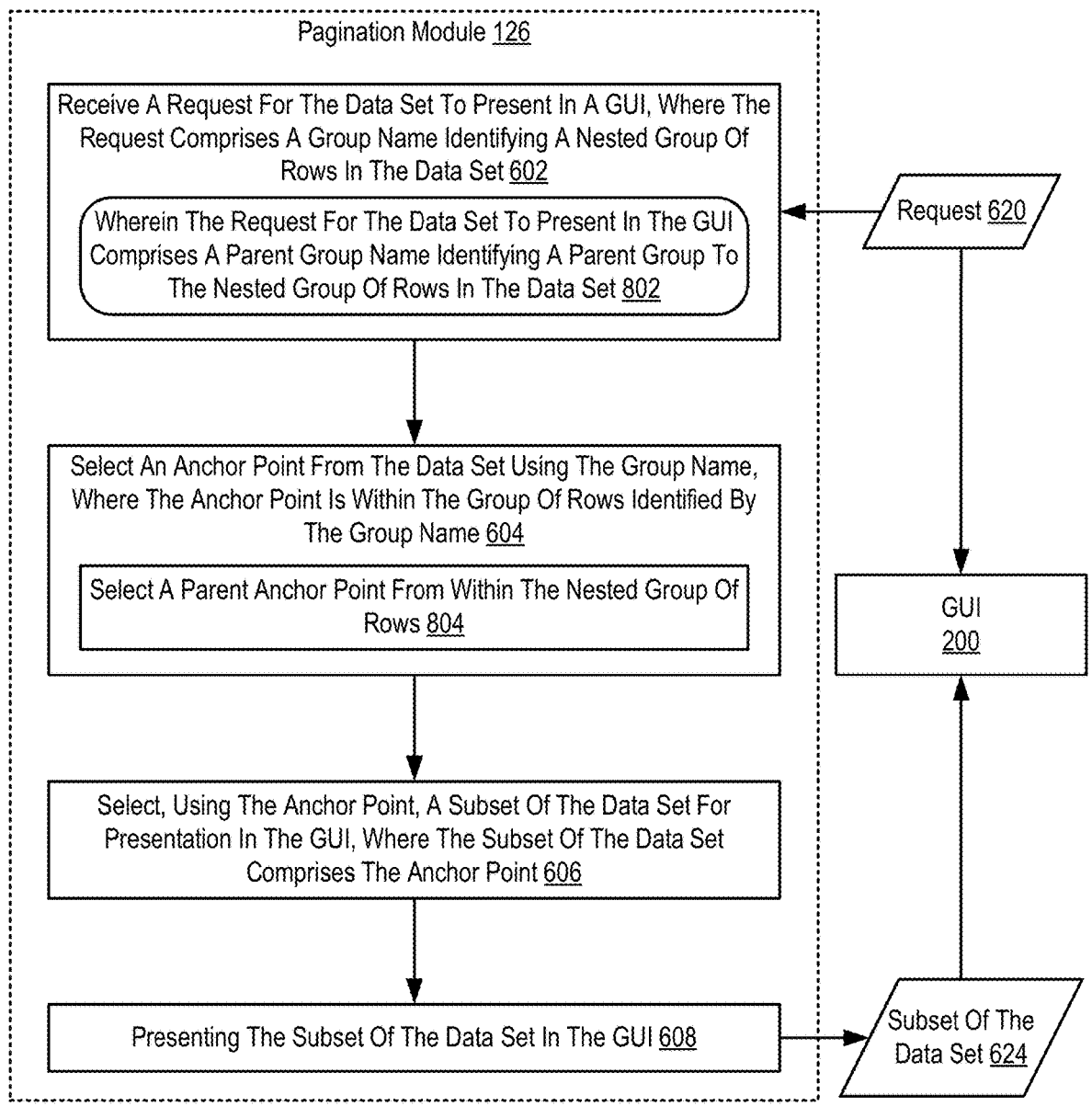
FIG. 8 sets forth a flow chart illustrating an exemplary method for nested pagination for presenting a data set in a GUI according to embodiments of the present invention.

For further explanation, FIG. 8 sets forth a flow chart illustrating a further exemplary method for nested pagination for presenting a data set in a GUI according to embodiments of the present invention that includes receiving (602) a request (620) for the data set to present in a GUI (200), wherein the request (620) comprises a group name identifying a nested group of rows in the data set; selecting (604) an anchor point from the data set using the group name, wherein the anchor point is within the group of rows identified by the group name; selecting (606), using the anchor point, a subset of the data set (624) for presentation in the GUI, wherein the subset of the data set (624) comprises the anchor point; and presenting (608) the subset of the data set (624) in the GUI (200).

The method of FIG. 8 differs from the method of FIG. 3, however, in that receiving (602) a request (620) for the data set to present in a GUI (200), wherein the request (620) comprises a group name identifying a nested group of rows in the data set includes wherein (802) the request (620) for the data set to present in the GUI comprises a parent group name identifying a parent group to the nested group of rows in the data set. The parent group name identifying a parent group to the nested group of rows in the data set is a column that is hierarchically higher than the nested group. For example, in FIGS. 2-5, the state column is a parent group to the year column.

The method of FIG. 8 also differs from the method of FIG. 3, however, in that selecting (606), using the anchor point, a subset of the data set (624) for presentation in the GUI, wherein the subset of the data set (624) comprises the anchor point includes selecting (804) a parent anchor point from within the nested group of rows. Selecting (804) a parent anchor point from within the nested group of rows may be carried out by the pagination module (126) determining a row in the parent group for designation as a parent anchor point. The selection may be based on the location of the anchor point in the nested group or may be based on a selection policy.

In view of the explanations set forth above, readers will recognize that the benefits of nested pagination for presenting a data set in a GUI according to embodiments of the present invention include:

Improving the operation of a computing system by selecting a subset of a data set for display in a GUI on a client system without using large row offsets, increasing computing system efficiency and usability.

Improving the operation of a computing system by requesting and displaying a subset of a data set with minimal resource overhead, increasing computing system efficiency and usability.

Exemplary embodiments of the present invention are described largely in the context of a fully functional computer system for nested pagination for presenting a data set in a GUI. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product.

Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of nested pagination for presenting a data set in a graphical user interface (GUI), the method comprising:
receiving a request for the data set to present in a GUI, wherein the request comprises a group name identifying a nested group of rows in the data set, the data set comprises data stored in a cloud-based data warehouse, and the GUI comprises a web browser;
selecting an anchor point from the data set using the group name, wherein the anchor point is within the group of rows identified by the group name;
selecting, using the anchor point, a subset of the data set for presentation in the GUI, wherein the subset of the data set comprises the anchor point; and
presenting the subset of the data set in the GUI.

2. The method of claim 1, wherein selecting, using the anchor point, the subset of the data set for presentation in the GUI comprises selecting the subset of the data set for presentation in the GUI using a row limit and an offset from the anchor point.

3. The method of claim 1,
wherein the request for the data set to present in the GUI comprises a parent group name identifying a parent group to the nested group of rows in the data set, and
wherein selecting the anchor point from the data set using the group name comprises selecting a parent anchor point from within the nested group of rows.

4. The method of claim 1, wherein receiving the request for the data set to present in the GUI comprises receiving an instruction to expand the group of rows.

5. The method of claim 1, wherein receiving the request for the data set to present in the GUI comprises detecting that a user has scrolled to an edge of the subset of the data set.

6. The method of claim 1, wherein the subset of the data set comprises at least one row from outside the nested group of rows.

7. The method of claim 1, wherein the anchor point is selected without using a row number.

8. An apparatus for nested pagination for presenting a data set in a graphical user interface (GUI), the apparatus comprising a computer processor, a computer memory operatively coupled to the computer processor, the computer memory having disposed within it computer program instructions that, when executed by the computer processor, cause the apparatus to carry out the steps of:
receiving a request for the data set to present in a GUI, wherein the request comprises a group name identifying a nested group of rows in the data set, the data set comprises data stored in a cloud-based data warehouse, and the GUI comprises a web browser;
selecting an anchor point from the data set using the group name, wherein the anchor point is within the group of rows identified by the group name;
selecting, using the anchor point, a subset of the data set for presentation in the GUI, wherein the subset of the data set comprises the anchor point; and
presenting the subset of the data set in the GUI.

9. The apparatus of claim 8, wherein selecting, using the anchor point, the subset of the data set for presentation in the GUI comprises selecting the subset of the data set for presentation in the GUI using a row limit and an offset from the anchor point.

10. The apparatus of claim 8,
wherein the request for the data set to present in the GUI comprises a parent group name identifying a parent group to the nested group of rows in the data set, and
wherein selecting the anchor point from the data set using the group name comprises selecting a parent anchor point from within the nested group of rows.

11. The apparatus of claim 8, wherein receiving the request for the data set to present in the GUI comprises receiving an instruction to expand the group of rows.

12. The apparatus of claim 8, wherein receiving the request for the data set to present in the GUI comprises detecting that a user has scrolled to an edge of the subset of the data set.

13. The apparatus of claim 8, wherein the subset of the data set comprises at least one row from outside the nested group of rows.

14. The apparatus of claim 8, wherein the anchor point is selected without using a row number.

15. A computer program product for nested pagination for presenting a data set in a graphical user interface (GUI), the computer program product disposed upon a non-transitory computer readable medium, the computer program product comprising computer program instructions that, when executed, cause a computer to carry out the steps of:
receiving a request for the data set to present in a GUI, wherein the request comprises a group name identifying a nested group of rows in the data set, the data set comprises data stored in a cloud-based data warehouse, and the GUI comprises a web browser;
selecting an anchor point from the data set using the group name, wherein the anchor point is within the group of rows identified by the group name;
selecting, using the anchor point, a subset of the data set for presentation in the GUI, wherein the subset of the data set comprises the anchor point; and
presenting the subset of the data set in the GUI.

16. The computer program product of claim 15, wherein selecting, using the anchor point, the subset of the data set for presentation in the GUI comprises selecting the subset of the data set for presentation in the GUI using a row limit and an offset from the anchor point.

17. The computer program product of claim 15,
wherein the request for the data set to present in the GUI comprises a parent group name identifying a parent group to the nested group of rows in the data set, and
wherein selecting the anchor point from the data set using the group name comprises selecting a parent anchor point from within the nested group of rows.

18. The computer program product of claim 15, wherein receiving the request for the data set to present in the GUI comprises receiving an instruction to expand the group of rows.

19. The computer program product of claim 15, wherein receiving the request for the data set to present in the GUI comprises detecting that a user has scrolled to an edge of the subset of the data set.

20. The computer program product of claim 15, wherein the subset of the data set comprises at least one row from outside the nested group of rows.

* * * * *